(No Model.) 2 Sheets—Sheet 1.

T. TRIPP.
ANTI-FRICTION JOURNAL BOX.

No. 439,284. Patented Oct. 28, 1890.

WITNESSES:
J. Edward Porter
Walter L. Perry

INVENTOR:
Thomas Tripp
BY
E. Frank Woodbury
ATTORNEY.

(No Model.) 2 Sheets—Sheet 2.

T. TRIPP.
ANTI-FRICTION JOURNAL BOX.

No. 439,284. Patented Oct. 28, 1890.

WITNESSES:
J. Edward Porter.
Walter L. Perry.

INVENTOR:
Thomas Tripp
BY
E. Frank Woodbury
ATTORNEY.

UNITED STATES PATENT OFFICE.

THOMAS TRIPP, OF AVON, ASSIGNOR TO THE TRIPP MANUFACTURING COMPANY, OF BOSTON, MASSACHUSETTS.

ANTI-FRICTION JOURNAL-BOX.

SPECIFICATION forming part of Letters Patent No. 439,284, dated October 28, 1890.

Application filed March 6, 1890. Serial No. 342,933. (No model.)

*To all whom it may concern:*

Be it known that I, THOMAS TRIPP, a citizen of the United States, residing at Avon, in the county of Norfolk and State of Massachusetts, have invented a new and useful Anti-Friction Journal-Box, of which the following is a specification.

My invention relates to anti-friction journal-boxes designed for the bearings of shafts and the like, especially for shafts of large diameters which are used to transmit heavy powers, such as the main shaft of an engine or a water-wheel shaft, or the jack-shaft of a line of shafting and propeller-shafts. It has for its object an anti-friction journal-box possessing great strength and durability under the most severe conditions of use, especially in cases where the box is submitted to intermittent shocks, like the main box or bearing of an engine. It is also especially constructed with reference to being placed upon a shaft without disturbing any pulley or collar and the like which may be forged onto or fastened to the shaft.

The drawings represent in reduced scale a box designed for use on a main or jack shaft of large power-transmitting capacity, and it may be applied without disturbing any of the pulleys or collars which may be on the shaft.

Figure 1:
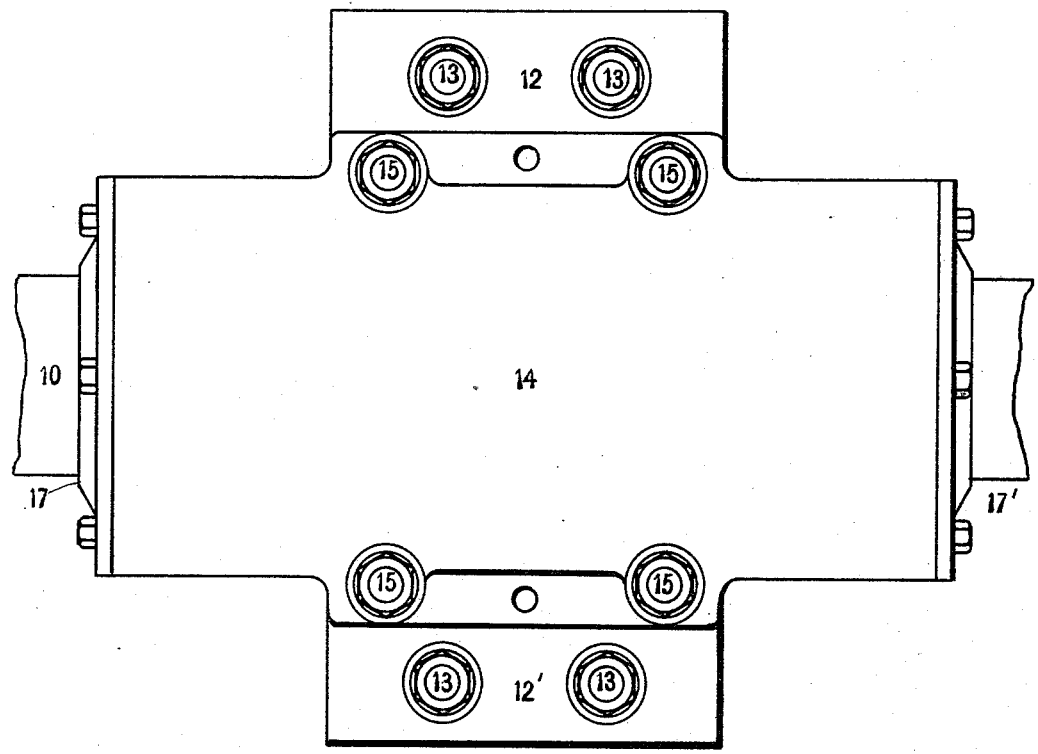
Figure 2:
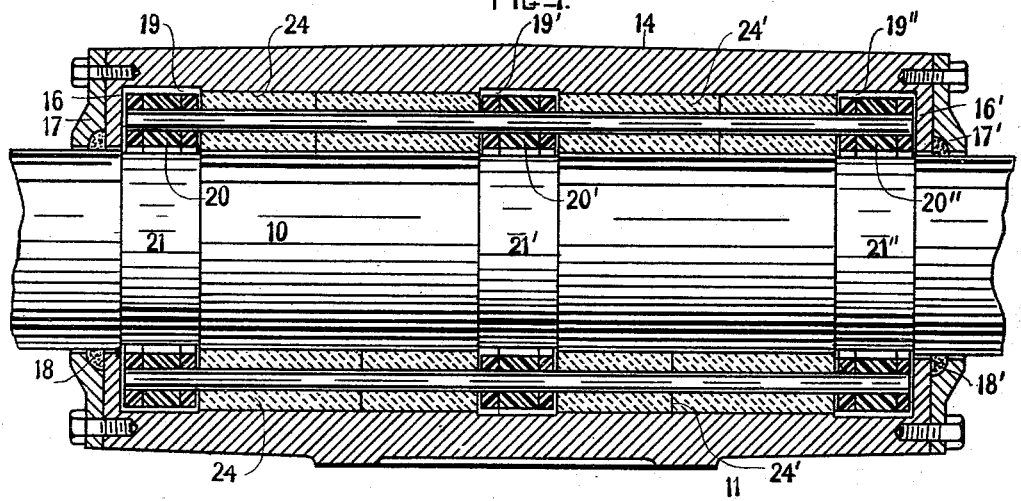
Figure 5:
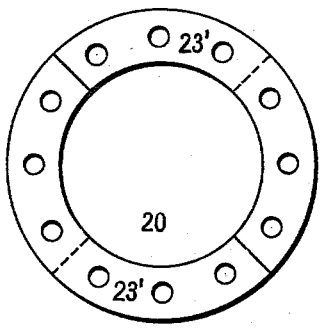
Figure 6:
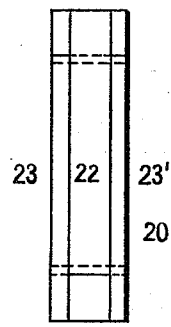
Figure 7:
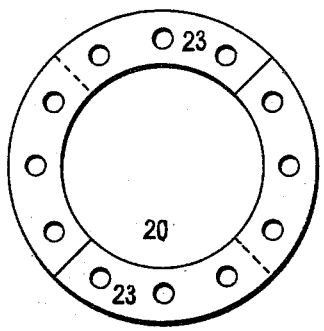
Figure 3:
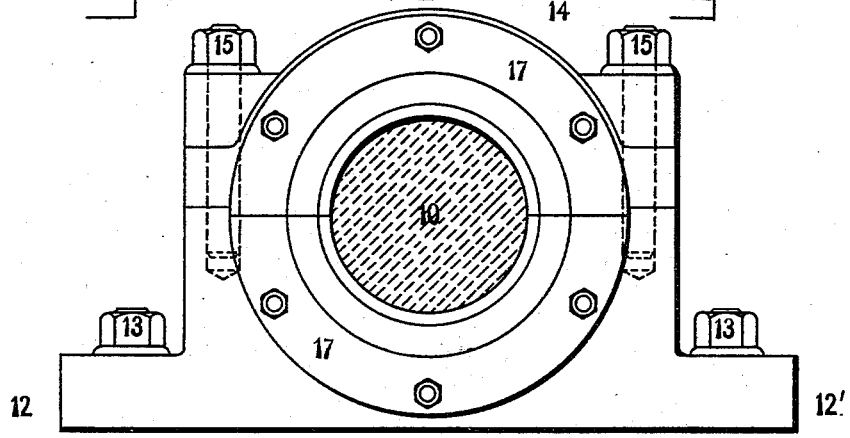
Figure 4:
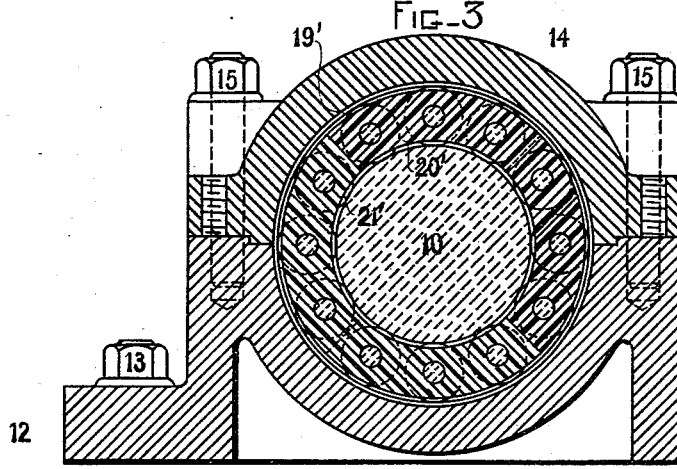

Figure 1 represents the anti-friction journal-box in plan, and Fig. 2 is a vertical central longitudinal sectional view of the same. Fig. 3 represents the anti-friction journal-box in end elevation, and Fig. 4 is a vertical central cross-sectional view of the box. Fig. 5 represents one of the roll-carrying rings in front elevation, and Fig. 6 is a side elevation of the same. Fig. 7 represents one of the roll-carrying rings in rear elevation.

The box which is designed to receive the shaft 10 is provided with the base 11, having the side base-flanges 12 and 12' and bolts 13, by means of which the box is fastened to its pedestal, the cap 14, which is bolted to the base of the box by means of the cap-bolts 15, the roll-retaining side flanges 16 and 16', which are designed to receive the end-thrusts of the roll-carrying device, and the packing-plates 17 and 17', having the packings 18 and 18', respectively, which are designed to lessen the escape of oil out of and the entrance of the dust into the box. The packing-plates are made in halves in order that they may be applied to the box without disturbing the shaft or any pulleys or collars that may be attached to the shaft. The box is also provided with the counter-bores 19, 19', and 19'', opposite the outer circumference of the roll-carrying rings 20, 20', and 20'', respectively, and the shaft 10 is provided with the reduced diameters 21, 21', and 21'', opposite the inner circumference of the roll-carrying rings 20, 20', and 20'', respectively. These counter-bores and reduced diameters are provided for the purpose of preventing the wearing of ridges by the rolls at the sides of the path of their travel.

The roll-carrying rings 20, 20', and 20'' are alike, and the ring 20 is represented by Figs. 5, 6, and 7, and is constructed as follows: The center ring 22 is cut in halves, and on each side of the center ring are placed the outer rings 23 and 23', which are made in halves, and the cuts are placed quartering with the cuts of the center ring. These rings when united by the roll-carrying pins, which are forced through the holes provided for that purpose in the rings, make a strong substantial ring, well adapted to perform its duty of carrying the rolls in perfect alignment. The three roll-carrying rings when permanently united by the roll-carrying pins make what is termed a "skeleton frame."

There are mounted on the roll-carrying pins the two sets of rolls 24 and 24', each set being composed of rolls of different lengths so arranged relative to each other that the joint between the two rolls on one pin will not come opposite the joint between the two rolls on the pins next adjoining. This arrangement is for the purpose of preventing the wearing of ridges in the path of the travel of the rolls. Each set of rolls has mounted upon each roll-carrying pin two or more rolls, it having been practically demonstrated that rolls of short lengths should be used in order to lessen the tendency of the rolls to get out of alignment, this tendency being lessened proportionally with the shortening up of the length of the roll.

The permanently-united skeleton frame, composed of the roll-carrying rings (each being made of several circular sections) and the roll-carrying pins, each pin having mounted thereon the rolls of different lengths in such a manner as will leave them free to revolve on the pins in operation, produces results that are very desirable, such as freedom of motion, perfect alignment, great strength, and durability. If the box could not produce these results, it would be very difficult, if not impossible, to prevent "pounding" when the box was used as the main bearing of an engine, the tendency to pound being caused by the reciprocating movement of the engine-piston, which as it reciprocates changes the direction of the strains upon the bearing or box.

What I claim as new, and desire to secure by Letters Patent, is—

1. An anti-friction journal-box provided with three or more sectional roll-carrying rings and a set of roll-carrying pins, which are permanently united, and sets of rolls of different lengths mounted on said pins, substantially as described.

2. An anti-friction journal-box provided with the sectional roll-carrying rings, the set of roll-carrying pins and rolls mounted thereon, and the housing provided with the sectional oil and dust guards, substantially as and for the purpose set forth.

3. In an anti-friction journal-box, the roll-carrying rings, each of which is made up of several circular pieces, and the roll-carrying pins having rolls of different lengths mounted thereon, in combination with the housing having counter-bores opposite the path of travel of each roll-carrying ring and having the roll-retaining flanges, substantially as and for the purpose set forth.

4. In an anti-friction journal-box, the permanently-united sectional roll-carrying rings and the roll-carrying pins with the rolls mounted thereon, in combination with the housing provided with the roll-retaining flanges and the sectional oil and dust guards, and the packings compressed between said flanges and guards for the purpose of preventing the escape of the lubricant out of and the dust into the box, substantially as described.

In testimony whereof I have signed my name to this specification in the presence of two subscribing witnesses.

THOMAS TRIPP.

Witnesses:
WALTER L. PERRY,
J. EDWARD PORTER.